United States Patent [19]

Egli

[11] Patent Number: 4,866,626
[45] Date of Patent: Sep. 12, 1989

[54] NAVIGATION BY A VIDEO-CAMERA SENSED GROUND ARRAY

[76] Inventor: Werner H. Egli, 2107 Willow Ave. North, Minneapolis, Minn. 55441-1814

[21] Appl. No.: 98,341

[22] Filed: Sep. 18, 1987

[51] Int. Cl.$^4$ ............................................. G08G 5/00
[52] U.S. Cl. .................................... 364/449; 364/456; 340/947; 340/954
[58] Field of Search ............... 364/449, 450, 428, 439, 364/460, 458, 456; 342/33-35; 340/94.8, 951"954

[56] References Cited

U.S. PATENT DOCUMENTS

| | | |
|---|---|---|
| 3,224,709 | 12/1965 | Blizard . |
| 3,352,223 | 11/1967 | Garra . |
| 3,653,769 | 4/1972 | Albright . |
| 3,671,963 | 6/1972 | Assouline et al. ................... 340/948 |
| 3,964,015 | 6/1976 | Collins ................................. 340/951 |
| 4,063,218 | 12/1977 | Basov et al. ......................... 340/951 |
| 4,123,165 | 10/1978 | Brown et al. ........................ 356/152 |
| 4,136,949 | 1/1979 | Hayamizu et al. ..................... 356/1 |
| 4,158,885 | 6/1979 | Neuberger ............................ 364/460 |
| 4,225,226 | 9/1980 | Davidson et al. ...................... 356/1 |
| 4,291,294 | 9/1981 | Chas ..................................... 340/951 |
| 4,299,483 | 11/1981 | Grove et al. .......................... 356/152 |
| 4,313,678 | 2/1982 | Colvocoresses ........................ 356/2 |
| 4,373,804 | 2/1983 | Pryor et al. ............................. 356/1 |
| 4,385,354 | 5/1983 | Hornfeld et al. .................... 340/952 |
| 4,391,514 | 7/1963 | Webster ................................. 356/1 |
| 4,441,809 | 4/1984 | Dudley et al. ........................... 356/1 |
| 4,457,625 | 7/1984 | Greenleaf et al. ................... 356/360 |
| 4,590,471 | 5/1986 | Pieroway et al. ..................... 340/948 |
| 4,635,203 | 1/1987 | Merchant ............................. 364/458 |
| 4,667,196 | 5/1987 | Kaul ..................................... 340/948 |
| 4,672,562 | 6/1987 | Egli et al. .............................. 364/559 |
| 4,672,564 | 6/1987 | Egli et al. .............................. 364/559 |
| 4,689,748 | 8/1987 | Hofmann .............................. 364/456 |
| 4,695,959 | 9/1987 | Lee et al. .............................. 364/458 |

OTHER PUBLICATIONS

Merchant, "Exact Area Registration of Different Views of a Common Object Scene", 5/81, pp. 424-436, Optical Engineering.

Primary Examiner—Parshotam S. Lall
Assistant Examiner—Thomas G. Black
Attorney, Agent, or Firm—John G. Shudy, Jr.

[57] ABSTRACT

Navigation by interpretation of images of parallelogram corner points of a ground beacon array. A video camera senses images of the beacon array and a computer interprets the images to provide attitude and location of the platform, on which the camera is mounted, relative to the array.

15 Claims, 4 Drawing Sheets

NAVIGATION BY A VIDEO-CAMERA SENSED GROUND ARRAY

FIELD OF THE INVENTION

The present invention pertains to navigation and particularly the air navigation by reference to land-based arrays. More particularly, the invention pertains to navigation by interpretation of images of beacons located at the corners of a ground array.

RELATED ART

Systems of the related art have included ranging relative to a fixed point, with the aid of an electro-optical sensor system and computer. Other systems disclose determination of attitude and distance between two bodies with reference to a plurality of points on the earth's surface.

SUMMARY OF THE INVENTION

The present invention is a method and apparatus utilizing an electro-optical sensor or a conventional video camera, having an addressable pixel-by-pixel output, and hardware for framing images and computing image centers of gravity. The latter hardware and respective functions define precise coordinates of the images. A microcomputer capable of processing the computations at a reasonable repetition rate is also used. Each set of microcomputer computations yields navigational information, comprising position and attitude of the sensor or camera relative to the ground array, and thus to an earth-fixed frame of reference. The sensor or camera may be typically mounted on a movable platform such as an aircraft or spacecraft. Hence, because of the defined positional and attitudinal relationship of the sensor or camera to the vehicle, etc., the resulting information serves to define the position and orientation of the vehicle relative to the array. The computer may be located on the platform or in a remote area. The ground array may consist of beacons or other emanating devices of visible light, infrared light, or other electromagnetic energy sensed by the sensor or camera. The array may also be located at sea or in space. The invention may be used day or night under various environmental conditions including foggy and cloudy conditions, under which the beacons may be emanating an appropriate electromagnetic energy, such as certain infrared wavelengths to be detected by the sensor or camera.

DESCRIPTION OF THE PREFERRED EMBODIMENT

Figure 1:
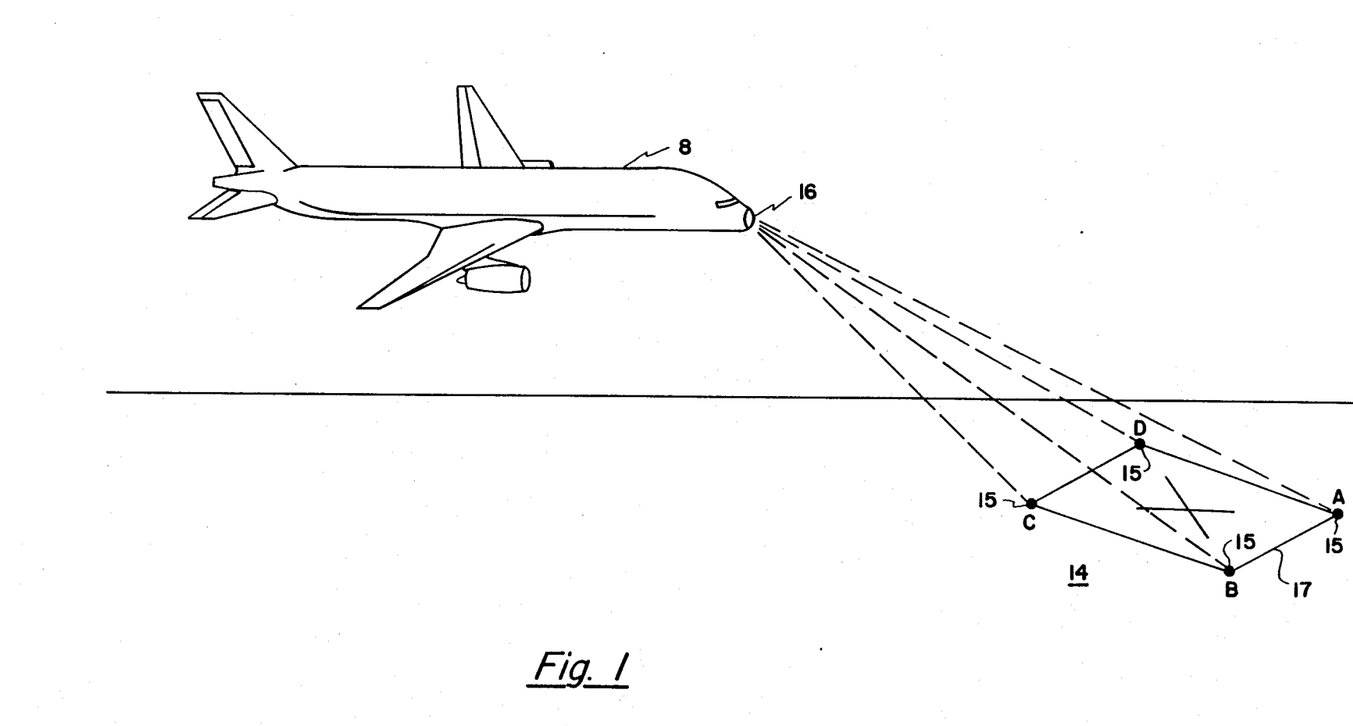
FIG. 1 illustrates an aircraft utilizing a sensing device relative to a ground array of emanating devices.

FIG. 1 shows an application of the present invention with aircraft 8 embodying apparatus 10 (of FIG. 2) and navigating relative to ground array 17 of emanating devices 15. The method of the invention comprises navigation through calculations of sensed images from an array having a plurality of devices 15.

Figure 2:
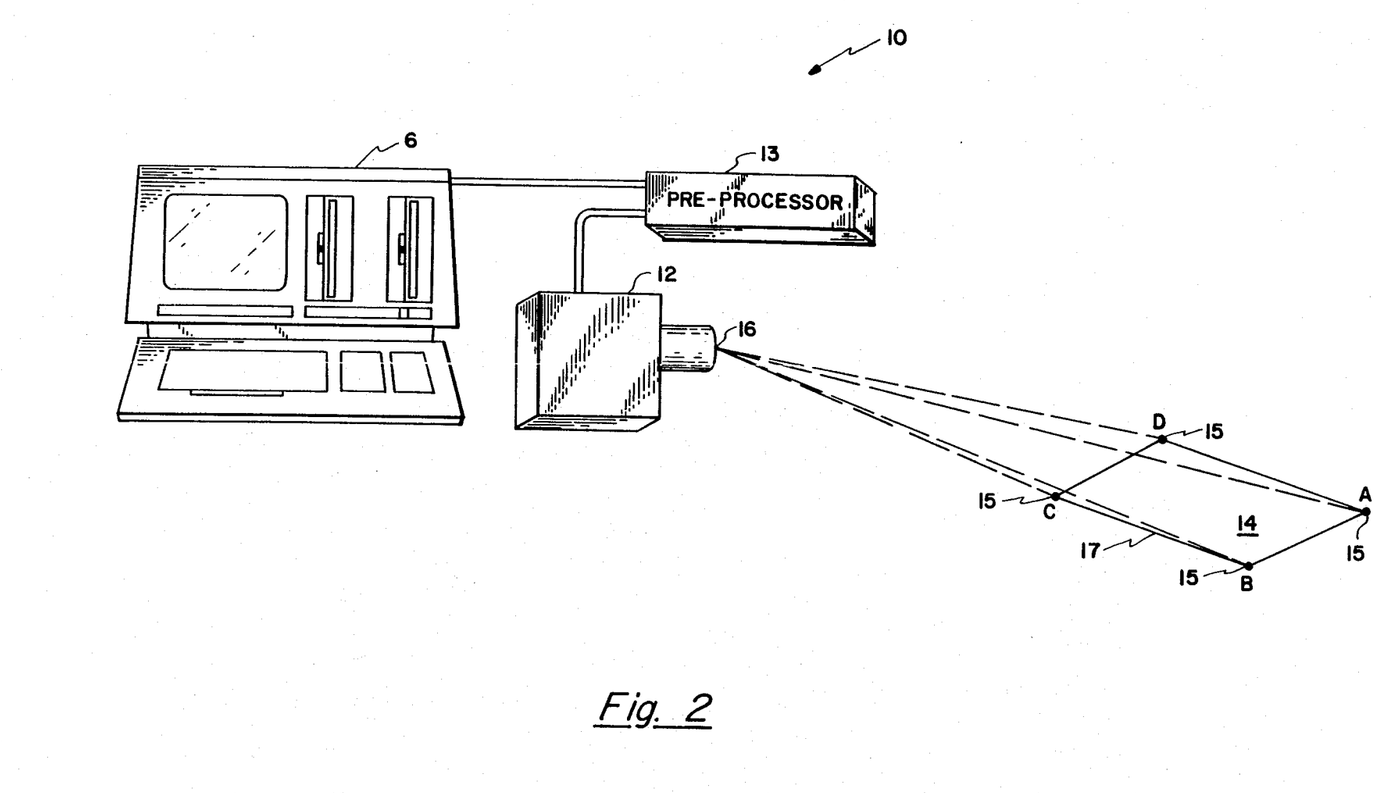
FIG. 2 shows the connection among the computer, sensing camera and interface.

The specific embodiment of apparatus 10, as illustrated in FIG. 2, incorporates a Pulnix model TM 540 video camera 12, having a standard addressable pixel-by-pixel output, a Matrox model PIP 640B device 13 for data gathering, preprocessing, pixel addressing, and interfacing, and a microcomputer 6 of nominal computing power, as exemplified by that of any contemporary personal computer using, for instance, an Intel 8086 microprocessor chip, for computing, displaying, storing and comparing data in accordance with the method of the invention. This apparatus is easily assembled and programmed according to the method described below, by anyone skilled in the art. Camera 12 senses light of beacons 15 of array 17, as images focused on image plane 18 (of FIGS. 3 and 4) which is located within camera 12. The location of the beacon images on plane 18 are distinguished by specific pixels of the sensing screen which is integral with plane 18. The signals incorporating image locations of beacon 15 go from camera 12 to data gatherer and preprocessor 13 and on to computer 6, consistent with the method of the present invention.

Figure 3:
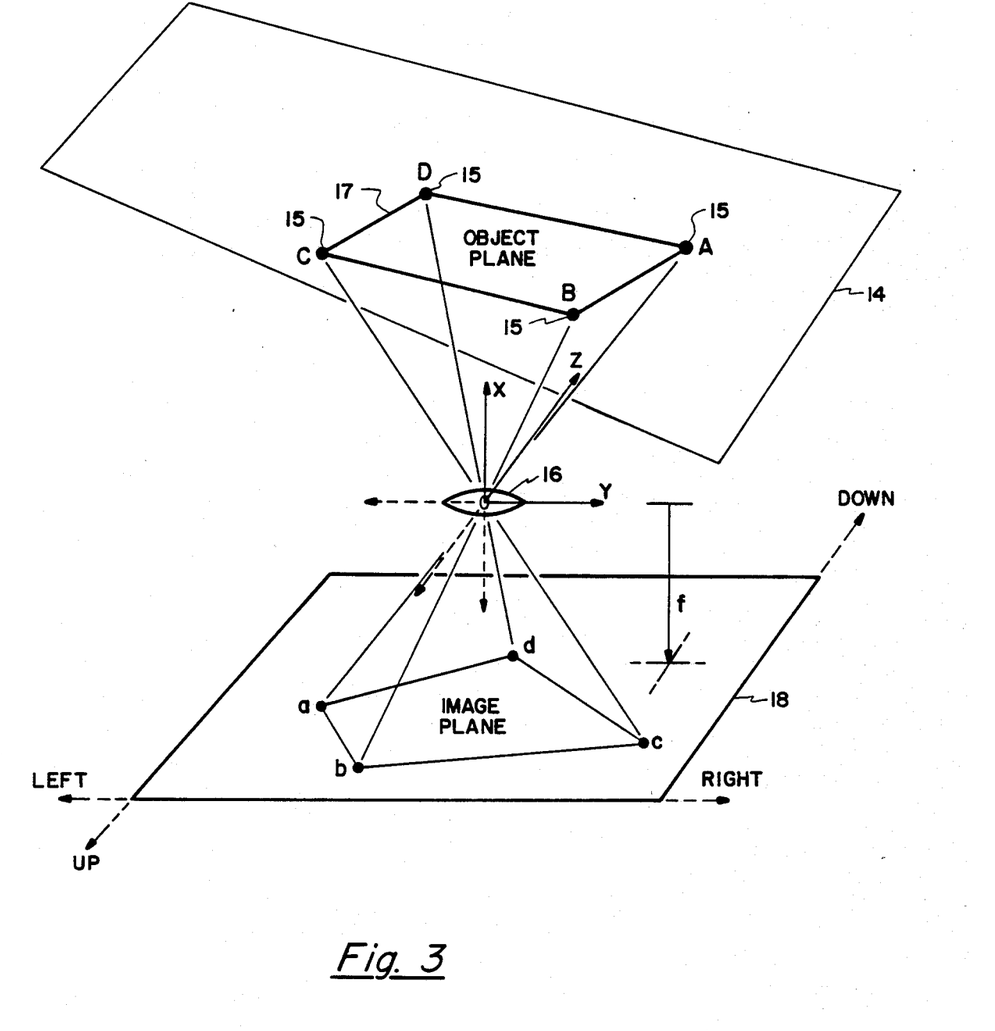
FIG. 3 illustrates the relationship between the object and image planes.
Figure 4:
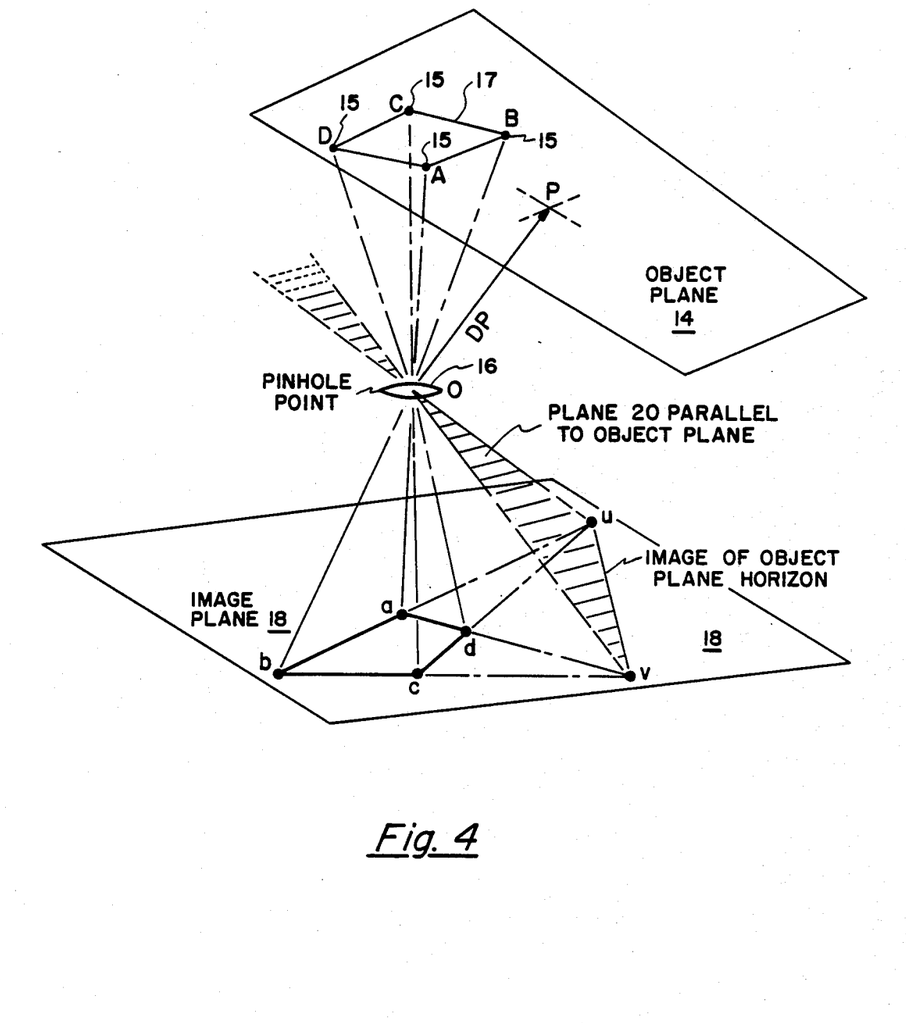
FIG. 4 shows a horizon in the context of the object and image planes.

The present specific embodiment of the invention involves sensing only four beacons 15, through more may be included, which are placed so as to define four corners of a parallelogram ABCD in an object plane 14 which is the earth's surface in the present description, through plane 14 may have other locations in places such as space. Beacons 15 are regarded as object point location vectors relative to video-camera 12, denoted by A, B, C and D which correspond to images (in video image plane 18) designated by location vectors a, b, c and d, respectively, as illustrated in FIGS. 3 and 4. A coordinate frame is used with an origin, O, at the "pinhole point" 16 of video-camera 12, and having axes aligned with the two principal directions in the video plane 18 ("left-right" and "up-down") and with a perpendicular thereto. Object space coordinates are defined, as follows, in conformity with conventions used for aircraft axes and are depicted in FIG. 3 as solid lines emanating from point 16. Visualizing and looking through camera 12 from behind it, and positioning camera 12 in a conventional orientation, $+x$ coordinates, and the $+i$ unit vector, are forward; $+y$ coordinates, and the $+j$ unit vector, are to the right; $+z$ coordinates, and the $+k$ unit vector, are down. In order that image vectors be positive scalar multiples of the corresponding object vectors, the conventions for image coordinates, as depicted in FIG. 2 as dashed lines emanating from point 16, are as follows: $+x$ and $+i$ are backwards from O and through image plane 18; $+y$ and $+j$ are to the left; $+z$ and $+k$ are up. All points in camera image plane 18 lie at some common distance "f", perpendicular to the image plane, from O, and thus all image points have the same x axis component of vector distance from the origin, namely, $+f$.

In FIG. 4, if the two lines through the image-point pairs a,b and c,d meet at the image point denoted by the vector u and the two lines through b,c and a,d meet at v, then the line through u and v constitutes the image of the line through the object points U and V, which are the meeting points of lines through the object point-pairs A,B and C,D for U, and B,C and A,D for V. However, since the object points A, B, C and D define a parallelogram, the points of intersection, U and V, are at infinity and not illustrated in the Figures of the present application. The line through U and V is the object space horizon for plane 14 containing A, B, C and D, and the line through u and v is the image of the horizon. Because U and its image u lie along a line through O, and likewise for V and v, it follows that the plane defined by the lines O-to-U and O-to-V is the same plane as that defined by the lines O-to-u and O-to-v. Also, because U and V are at infinity, the plane defined by O-to-U and O-to-V (and, in fact, any plane defined by Z-to-U and Z-to-V, where Z is any arbitrary point) is parallel to plane 14. So, u and v serve to define the orientation of the ABCD plane. Next one determines how far that plane is from O, and thence solves for A, B, C and D, and finally gets an expression for the range vector DP of some designated object plane 14 reference point P, and the orientation matrix of that object plane 14, relative to origin 16 of camera 12, and to the camera 12 coordinate axes. This determination yields the location and orientation of the camera 12 relative to the object plane 14, and thence the position and orientation of aircraft 8 in which the camera 12 is embedded.

The mathematical details of the method of determining the location and orientation of camera 12 relative to the plane are provided here. Having the coordinates of the images a, b, c, and d, one can solve for u and v by the ensuing method. The following vector quantities are defined:

$$\begin{aligned} s1 &= (a+b)/2 & d1 &= (a-b)/2 \\ s2 &= (b+c)/2 & d2 &= (b-c)/2 \\ s3 &= (c+d)/2 & d3 &= (c-d)/2 \\ s4 &= (d+a)/2 & d4 &= (d-a)/2 \\ <s> &= (a+b+c+d)/4 \end{aligned} \quad (1)$$

Then, the fact that u lies along a,b and along c,d is expressed by the two relations:

$$\begin{aligned} u &= s1 + G*d1 \\ u &= s3 + H*d3, \end{aligned} \quad (2)$$

where G and H are unknown scalars, to be solved for, and "*" means multiply. By subtraction, one gets from (2) the equation:

$$\begin{aligned} d1*G - d3*H &= s3 - s1 \\ &= d4 - d2 \end{aligned} \quad (3)$$

From (3), one gets, by vector-multiplying by d3 and by d1, respectively:

$$(d3 \times d1)*G = d3 \times (d4 - d2)$$
$$(d3 \times d1)*H = d1 \times (d4 - d2) \quad (4)$$

(v1×v2 denotes "vector cross-product of vectors v1 and v2".)
One converts (4) to two scalar equations, by scalar-multiplying by the unit x-axis vector, i:

$$(i.d3 \times d1)*G = i.d3 \times (d4 - d2)$$

$$(i.d3 \times d1)*H = i.d1 \times (d4 - d2) \quad (5)$$

v1.v2 means "scalar product of v1 and v2", aka "dot-product of v1 and v2". Hence, one has:

$$G = (i.d3 \times (d4 - d2))/(i.d3 \times d1)$$
$$H = (i.d1 \times (d4 - d2))/(i.d3 \times d1) \quad (6)$$

Since all the d's are in the y-z plane, the triple scalar products (denoted for short by a set of Q's) are fairly simple expressions:

$$\begin{aligned} Q31 &= i.d3 \times d1 &&= D3Y*D1Z - D3Z*D1Y \\ Q342 &= i.d3 \times (d4-d2) &&= D3Y*(D4Z-D2Z) - D3Z*(D4Y-D2Y) \\ Q142 &= i.d1 \times (d4-d2) &&= D1Y*(D4Z-D2Z) - D1Z*(D4Y-D2Y), \end{aligned} \quad (7)$$

where D1Y denotes y-component of d1, D1Z denotes z-component of d1, and analogously for d2, d3 and d4. So:

$$G = Q342/Q31$$
$$H = Q142/Q31 \quad (8)$$

The simplest way of expressing u is to average the two formulations for u in (2):

$$\begin{aligned} u &= (s1 + G*d1 + s3 + H*d3)/2 \\ &= <s> + (Q342*d1 + Q142*d3)/(2*Q31) \end{aligned} \quad (9)$$

In a similar fashion, one solves for the vector v, getting:

$$v = <s> + (Q413*d2 + Q213*d4)/(2*Q42), \quad (10)$$

where:

$$\begin{aligned} Q42 &= D4Y*D2Z - D4Z*D2Y \\ Q413 &= D4Y*(D1Z - D3Z) - D4Z*(D1Y - D3Y) \\ Q213 &= D2Y*(D1Z - D3Z) - D2Z*(D1Y - D3Y) \end{aligned} \quad (11)$$

Having u and v, which are two vectors emanating from O to the video plane, one can describe the plane of u and v conveniently by defining the direction normal to the plane, which is represented by the vector u×v. This vector is:

$$N = u \times v = $$
$$(t1 \times t2)/(4*Q31*Q42) - <s> \times (t1/(2*Q31) - t2/(2*Q42)),$$

where $$t1 = Q342*d1 + Q142*d3$$
$$t2 = Q413*d2 + Q213*d4$$

In order to deal with singularities which would arise if two sides of the image plane quadrilateral were parallel (i.e., if u and/or v lie at or near infinity in the image plane), one multiplies the above expression for N by 4*Q31*Q42, to give the modified N formulation:

$$N = t1 \times t2 - 2*<s> \times (Q42*t1 - Q31*t2) \quad (12)$$

One proceeds with the solution by exploiting the fact that all points in the object plane (including, in particular, the four object points A, B, C and D) are at some same perpendicular distance, DP, along N, from O. A, B, C and D are all scalar multiples of the image plane vectors a, b, c and d, respectively. Therefore, one has the set of equations connecting the object and image vectors:

$$A = |N|*DP*a/(a.N)$$
$$B = |N|*DP*b/(b.N)$$
$$C = |N|*DP*c/(c.N)$$
$$D = |N|*DP*d/(d.N), \qquad (13)$$

where $|N|$ is the magnitude of N.

One can solve this for DP, by using the fact that one knows the magnitudes of the sides of the object quadrilateral, defined by A-B, B-C, C-D and D-A. Putting:

$$|A - B| = |C - D| = L1$$
$$|B - C| = |D - A| = L2,$$

one gets:

$$|N|*DP*|a/(a.N) - b/(b.N)| = L1$$
$$|N|*DP*|b/(b.N) - c/(c.N)| = L2, \qquad (14)$$

whereby:

$$DP1 = L1/(|N|*|a/(a.N) - b/(b.N)|)$$
$$DP2 = L2/(|N|*|b/(b.N) - c/(c.N)|) \qquad (15)$$

In principle, the two versions of DP should be of identical value. In practice, they will differ slightly, due to noise, etc. So, one gets a best estimate of DP by root mean squaring the two versions:

$$\begin{aligned} DP &= SQRT((DP12 + DP22)/2) \\ &= R/|N|, \end{aligned} \qquad (16)$$

("SQRT" signifies square root and "**" raises to a power) where:

$$R = SQRT((L12/z12 + L22/z22)/2)$$
$$z1 = a/(a.N) - b/(b.N)$$
$$z2 = b/(b.N) - c/(c.N)$$

So:

$$A = R*a/(a.N)$$
$$B = R*b/(b.N)$$
$$C = R*c/(c.N)$$
$$D = R*d/(d.N) \qquad (17)$$

The reference point (PREFR) of the target point quartet will have been specified as some linear blend of A, B, C and D (with unity sum of weights). For instance, one may specify the "center-of-gravity":

$$PREFR = (A+B+C+D)/4 \qquad (18)$$

This gives the target location expressed in video-camera coordinates, and in the video-camera reference frame.

One needs to express PREFR in an earth-fixed reference frame, and to define the camera attitude relative thereto. To do this, one needs to compute the matrix of target array attitude, MTR, relative to the camera frame. To do so, one notes that the sides of the object array, defined by the vectors A-B, B-C, C-D and D-A, as seen in the camera frame, are matrix multiples of those same four sides, as expressed in the earth-fixed geographic frame:

$$D1 = MTR'*D1E$$
$$D2 = MTR'*D2E$$
$$D3 = MTR'*D3E$$
$$D4 = MTR'*D4E, \qquad (19)$$

where:

$MTR'$ = Transpose/Inverse of $MTR$ $$D1 = A - B$$
$$D2 = B - C$$
$$D3 = C - D$$
$$D4 = D - A,$$

$D1E = D1$ expressed in earth-fixed frame, and likewise for D2E, D3E, and D4E.

Since the object defines a parallelogram, D1=D3 and D2=D4; thus, in terms of usable information, (19) reduces to:

$$D1 = MTR'*D1E$$
$$D2 = MTR'*D2E \qquad (20)$$

One can adjust (20) in a useful (i.e. non-trivial) way, by using an identity which derives from the properties of rotation matrices, that is, any given rotation of the vectorcross-product of any two given vectors produces a vector which is identical to the cross-product of the two vectors resulting from applying the said rotation to the two aforesaid vectors:

$$R*(U \times V) = (R*U) \times (R*V), \qquad (21)$$

where R is any rotation matrix, and U and V are any two vectors. Therefore, one can extend (20) to the triplet:

$$\begin{aligned} D1 &= MTR'*D1E \\ D2 &= MTR'*D2E \\ D1 \times D2 &= MTR'*(D1E \times D2E) \end{aligned} \qquad (22)$$

Now, (22) defines a matrix equation:

$$MD = MTR'*MDE, \qquad (23)$$

where MD denotes the 3-by-3 matrix whose three columns comprise the three vectors D1, D2 and D1×D2 respectively, and where MDE denotes the 3-by-3 matrix whose three columns comprise the three vectors D1E, D2E and D1E×D2E respectively. With this, one can solve for MTR:

$$MTR = MDE*(1/MD), \qquad (24)$$

where 1/MD denotes the inverse of the matrix MD.

If there is no noise or errors, MTR as thus computed will, in fact, be a rotation matrix, as it is supposed to be. That is, the magnitudes of each of its three column vectors, and of each of its three row vectors, will be 1.0. Furthermore, the dot products of any two distinct column vectors, or of any two distinct row vectors will be zero. But, there will be noise, etc., and MTR won't be a perfect rotation matrix. So, one least-squares best-fits (BF) a rotation matrix to MTR. This is done by using an alternative definition of a rotation matrix as one whose transpose is equal to its inverse. This leads to the best-fit:

$$MTRBF = (((1/(MTR*MTR'))**\tfrac{1}{2})*MTR, \quad (25)$$

where

| | | |
|---|---|---|
| $MTR'$ | = | transpose of $MTR$ |
| $1/(MTR*MTR')$ | = | inverse of the matrix $MTR*MTR'$ |
| $((1/(MTR*MTR'))**\tfrac{1}{2}$ | = | that matrix which, when multiplied by itself, yields $1/(MTR*MTR')$. |

As one can easily confirm, (25) yields an MTRBF which is a perfect rotation matrix. Since, in fact, MTR*MTR' will be fairly close to the identity matrix, I, one expresses it as equal to I+e, (where, of course, e=MTR*MTR'−I), and then uses a Taylors series expansion:

$$(1/(MTR*MTR'))\tfrac{1}{2} = (I + e)(-\tfrac{1}{2})$$
$$= I - e/2 + 3*(e**2)/8 - 5*(e**3)/16 \ldots \text{etc.}$$

This expansion also results in the selection of the correct one of two square roots, namely, that corresponds to MTR (approx)=+I, rather than −I.

For the present purposes, the first order expression suffices:

$$I - e/2 = I - (MTR*MTR' - I)/2$$
$$= (3*I - MTR*MTR')/2$$

Therefore, (25) becomes:

$$MTRBF = (3*MTR - MTR'*MTR)/2 \quad (26)$$

Now one can obtain the camera attitude, MCAM, relative to the earth-fixed frame. This is simply the inverse, i.e., the transpose, of MTRBF:

$$MCAM = MTRBF'$$
$$= (3*MTR' - MTR'*MTR*MTR')/2$$

Additionally, to get the vector distance (CRANGE) of the camera point O from the chosen object reference point, expressed in earth-fixed coordinates, one simply multiplies PREFR first by −1 (to convert camera-to-object range to object-to-camera range), and then by the camera attitude matrix:

CRANGE = −MCAM*PREFR

I claim:

1. A method of navigation by a video-camera sensed array comprising:
sensing beacons of an array with a video camera, wherein the array is located externally to the camera, and the beacons are situated so as to represent corners of a parallelogram;
detecting locations of images of the beacons on an image plane of the camera;
translating the locations of the images into pixel addresses;
processing the pixel addresses in a manner so as to determine a position and an attitude of the camera relative to the beacons of the array, wherein said processing comprises:
defining the images on the image plane of the camera with vectors;
connecting first and second images with a first line;
connecting third and fourth images with a second line;
extending the first and second lines until they meet at a first point;
connecting second and third images with a third line;
connecting first and fourth images with a fourth line;
extending the first and second lines until they meet at a second point;
connecting the first and second points with a line which is an image of a horizon;
connecting the first point and a center point of a focal lens of the camera with a fifth line;
connecting the second point and the center point of the focal lens of the camera with a sixth line;
defining a first plane with the fifth and sixth lines, said plane being parallel with a second plane containing the beacons and defining orientation of the second plane; determining distance between the first and second planes; determining orientation of the second plane; and determining location and orientation of the camera relative to the beacons;
displaying the position and the attitude of the camera relative to the beacons;
storing the position and attitude; and
comparing the position and attitude with formerly stored positions and attitudes.

2. Method of claim 1 further comprising:
designating the beacons of the array forming the corners of a parallelogram as A, B, C and D vectors, respectively, artibrarily for identification;
designating the first, second, third and fourth images of the beacons on the image plane of the camera, as a, b, c and d vectors having one-to-one correspondence to vectors A, B, C and D, respectively, the vectors being defined in terms of x, y and z coordinates having an origin at the center point of the focal lens of the camera, having an i as a unit x-axis vector, perpendicular to the image plane and y and z axes in the image plane;
designating the first point by a vector u; and designating the second point by a vector v.

3. Method of claim 2 further comprising:
designating
vector quantity $<s> = (a+b+c+d)/4$,
vector quantity $d1 = (a-b)/2$,
vector quantity $d2 = (b-c)/2$,
vector quantity $d3 = (c-d)/2$,
vector quantity $d4 = (d-a)/2$,
vector quantity $s1 = (a+b)/2$, and
vector quantity $s3 = (c+d)/2$;
expressing vector u as $s1 + G*d1$ wherein G is a scalar
expressing vector u as $s3 + H*d3$, wherein H is a scalar;

eliminating vector u from set of equations
$u = s1 + G*d1$ and
$u = s3 + H*d3$;
vector multiplying by d3 and by d1;
scalar multiplying by the unit x-axis vector i;
expressing the results as triple scalar products denoted by Q's in view that all d's are in a y-z plane, where
D1Y denotes y-component of d1,
D1Z denotes z-component of d1,
D2Y denotes y-component of d2,
D2Z denotes z-component of d2,
D3Y denotes y-component of d3,
D3Z denotes z-component of d3,
D4Y denotes y-component of d4, and
D4Z denotes z-component of d4, resulting in
$Q31 = D3Y*D1Z - D3Z*D1Y$
$Q342 = D3Y*(D4Z - D2Z) - D3Z*(D4Y - D2Y)$
$Q142 = D1Y*(D4Z - D2Z) - D1Z*(D4Y - D2Y)$;
expressing u as equal to
$<s> + (Q342*d1 + Q142*d3)/(2*Q31)$;
deriving from v vector properties
triple scalar products of
$Q42 = D4Y*D2Z - D4Z*D2Y$
$Q413 = D4Y*(D1Z - D3Z) - D4Z*(D1Y - D3Y)$
$Q213 = D2Y*(D1Z - D3Z) - D2Z*(D1Y - D3Y)$
expressing $v = <s>(Q413*d2 + Q213*d4)/(2*Q42)$;
describing second plane of vectors u and v by defining a direction normal N to the second plane as $N = u \times v$; and
determining a first perpendicular distance DP1 along direction N from the center point of the focal lens of the camera to an object plane containing the beacons, by $DP1 = L1/(|N|*|a/(a.N) - b/(b.N)|$
where A, B, C and D are scalar multiples of vectors a, b, c and d, respectively,
$L1 = |A - B| + |C - D|$.

4. Method of claim 3 further comprising determining a second perpendicular distance DP2 along the direction N from the center point of the focal lens of the camera to the object plane containing the beacons, by $DP2 = L2/(|N|*|b/(b.N) - C/(C.N)|$ where $L2 = |B - C| = |D - A|$.

5. Method of claim 4 further comprising determining a third perpendicular distance DP as a best estimate by root mean squaring DP1 and DP2 as $DP = SQRT((DP12 + DP22)/2)$.

6. Method of claim 3 further comprising:
determining a reference point within the array of beacons;
expressing the reference point in an earth-fixed reference frame; and
defining an attitude of the camera relative to the reference point.

7. Method of claim 6 wherein said determining the reference point, PREFR, comprises:
noting that $PREFR = (A + B + C + D)/4$ which expresses target location in a camera reference frame;
defining sides of the beacon array by vectors $A - B$, $B - C$, $C - D$ and $D - A$ equal to D1, D2, D3 and D4, respectively, expressed in the camera frame;
expressing D1 and D2 in an earth-fixed frame as D1E and D2E, respectively, having the relationships of
$D1 = MTR'*D1E$ $D2 = MTR'*D2E$
where $D1 = D3$, $D2 = D4$, $MTR' = $ Transpose/Inverse of MTR and MTR is a matrix of the beacon array attitude relative to the camera frame;
defining MD as a 3 by 3 matrix having three columns comprising vectors D1, D2 and $D1 \times D2$, respectively;
defining MDE as a 3 by 3 matrix having three columns comprising vectors D1E, D2E and $D1E \times D2E$, respectively;
equating MD to MTR'*MDE; and
solving for MTR with $MTR = MDE*(1/MD)$
where 1/MD is the inverse of matrix MD.

8. Method of claim 7 comprising determining vector distance of the center point of the focal lens of the camera (CRANGE) from the reference point in earth-fixed coordinates by multiplying the reference point by $-1$ and then by camera attitude matrix,
$CRANGE = MCAM*PREPR$.

9. Method of claim 7 comprising:
least-squares best-fitting a rotation matrix to MTR according to
$MTRBF = (((1/(MTR*MTR'))**\frac{1}{2})*MTR$ where
$MTR' = $ transpose of MTR,
$1/(MTR*MTR') = $ inverse of matrix
$MTR*MTR'$, and matrix $(1/(MTR*MTR'))**\frac{1}{2}$ multiplied by itself yields $1/(MTR*MTR')$;
expressing $MTR*MTR'$ as $I + e$ where I is an identity matrix to which $MTR*MTR'$ approaches equality;
expanding $(1/(MTR'MTR'))**\frac{1}{2}$ according to a Taylors series;
solving for MTRBF with a first order expression of the Taylors series resulting in
$MTRBF = (3*MTR - MTR*MTR'*MTR)/2$;
solving for an attitude of the camera, MCAM, relative to an earth-fixed frame, by taking the inverse of MTRBF which is
$MCAM = (3*MTR' - MTR'*MTR*MTR')/2$; and
solving for the vector distance, CRANGE, of the camera in earth-fixed coordinates by multiplying PREFR by $-1$ and then by the attitude of the camera matrix as
$CRANGE = -MCAM*PREFR$.

10. A navigation device comprising:
sensing means for detecting objects of a ground array, wherein the ground array is a parallelogram in a first plane, having a first, second, third and fourth objects at the first, second, third and fourth corners, respectively, of the parallelogram, and said sensing means comprises: a focal lens; an image plane situated at a focal point of said lens; and addressing means, connected to said image plane for addressing image plane pixel outputs;
preprocessing means, connected to said sensing means, for preprocessing data from said sensing means;
computing means, connected to said preprocessing means, for processing preprocessed data from said preprocessing means into navigational information, including position and attitude of said sensing means relative to the ground array which lies in an earth-fixed frame of reference, wherein said computing means determines:
first, second, third and fourth object vectors that define the first, second, third and fourth objects, respectively;
first, second, third and fourth image points on said image plane, corresponding to the first, second, third and fourth objects, respectively;
first, second, third and fourth image vectors that define image points on said image plane corresponding to the first, second, third and fourth objects;

a coordinate frame having an origin and a reference relative to said sensing means such that the first, second, third and fourth image vectors are positive scalar multiples of the first, second, third and fourth object vectors, respectively;

a fifth image point by an intersection of a first line through the first and second image points and of a second line through the third and fourth image points;

a sixth image point by an intersection of a third line through the second and third object image points and of a fourth line through the first and fourth image points;

a horizon image by a fifth line through the fifth and sixth image points;

a second plane by a sixth line from the fifth image point through the origin of the coordinate frame and by a seventh line from the sixth image point through the origin of the coordinate frame, wherein the second plane defines an orientation of the first plane containing the ground array:

distance as a range vector between the origin of the coordinate frame and a point in the first plane by exploiting that the first, second, third and fourth objects are at some same perpendicular distance from the origin of the coordinate frame, and that the distances between the objects of the array are known; and an orientation matrix of the first plane that yields location and orientation of said sensing means relative to the first plane.

11. Apparatus of claim 10 wherein said computing means further determines position and orientation of a platform upon which said sensing means is mounted.

12. Apparatus of claim 11 wherein said sensing means is a video camera.

13. Apparatus of claim 12 wherein said computing means is a microcomputer.

14. Method of navigation by a video-camera sensed array comprising:

sensing, with an image plane in a camera, first, second, third and fourth object image points of first, second, third and fourth objects, respectively, in an array located externally to the camera, wherein the first, second, third and fourth objects are located at first, second, third and fourth corners, respectively, of a parallelogram;

determining first, second, third and fourth image vectors that define the first, second, third and fourth object image points, respectively, according to location on the image plane;

processing information of the first, second, third and fourth image vectors to determine position and attitude of the camera relative to the first, second, third and fourth objects in the array;

determining first, second, third and fourth object vectors that define the first, second third and fourth objects;

determining a coordinate frame having reference to the camera in conventional orientation and having an origin at a center of the camera's focal lens and such that the first, second, third and fourth image vectors are positive scalar multiples of the first, second, third and fourth object vectors, respectively;

determining a fifth image point by an intersection of a first line through the first and second object image points and of a second line through the third and fourth object image points;

determining a sixth image point by an intersection of a third line through the second and third object image points and of fourth line through the first and fourth object image points;

determining a horizon image by a fifth line through the fifth and sixth image points;

determining, parallel to a second plane containing the parallelogram, a first plane, by a sixth line from the fifth image point through the origin of the coordinate frame reference and by a seventh line from the sixth image point through the origin of the coordinate frame of reference, wherein said determining the first plane defines the orientation of the second plane containing the parallelogram;

determining distance as a range vector between the origin of the coordinate frame of reference and a point in the second plane by exploiting that the first, second, third and fourth objects are at some same perpendicular distance from the origin of the coordinate frame, that the first, second, third and fourth image vectors are positive scalar multiples of the first, second, third and fourth objects, respectively, and that the magnitudes between the corners of the parallelogram are known; and determining an orientation matrix of the second plane which yields locations and orientation of the camera relative to the second plane.

15. Method of claim 14 further comprising determining the position and orientation of the platform upon which the camera is mounted.

* * * * *